Sept. 1, 1942. G. H. ROSE Re: 22,172

APPARATUS FOR UNREELING BUNDLES OF COILED WIRE AND THE LIKE

Original Filed July 18, 1939 3 Sheets-Sheet 1

Inventor:
GEORGE H. ROSE,
by: John E. Jackson
his Attorney.

APPARATUS FOR UNREELING BUNDLES OF COILED WIRE AND THE LIKE

Original Filed July 18, 1939 3 Sheets-Sheet 2

Inventor:
GEORGE H. ROSE,
by: John E. Jackson
his Attorney

APPARATUS FOR UNREELING BUNDLES OF COILED WIRE AND THE LIKE

Original Filed July 18, 1939 3 Sheets-Sheet 3

Inventor:
GEORGE H. ROSE,
by: John E. Jackson
his Attorney.

Reissued Sept. 1, 1942

Re. 22,172

UNITED STATES PATENT OFFICE 22,172

APPARATUS FOR UNREELING BUNDLES OF COILED WIRE AND THE LIKE

George H. Rose, Cleveland Heights, Ohio

Original No. 2,263,889, dated November 25, 1941, Serial No. 285,164, July 18, 1939. Application for reissue April 20, 1942, Serial No. 439,778

7 Claims. (Cl. 242—129)

This invention relates to an apparatus for unreeling bundles of coiled wire, rod and the like, and, particularly, to an improved apparatus for continuously unreeling such materials.

Heretofore, it has been the usual practice to supply wire or rod to a wire-drawing machine or other wire-working machine by providing a plurality of bundles of coiled wire or rod for passage through the machine and feeding the wire or rod of the bundles individually into and through the machine. In such practice, after each bundle of wire was consumed, the machine had to be stopped until the next bundle of wire or rod was properly placed for unreeling and threaded into the machine and attached to the end of the wire of the previous bundle that has passed therethrough. This resulted in a loss of time and slowed up production considerably. Also, it was necessary for the operator to always be on duty in order to stop the machine before the bundle of wire passing therethrough had completely passed thereinto.

In the present invention, all of the above disadvantages have been eliminated and there is provided an unreeling apparatus or device which permits continuous operation of the wire-working machine.

Accordingly, it is one of the objects of the present invention to provide an improved apparatus or device for unreeling wire, rod and the like, which is automatically operated by the wire as it is drawn therefrom so as to place the coil in position to be properly unreeled, thereby supplying the material continuously to the machine with which it is to be used.

It is still another object of the present invention to provide an improved apparatus or device for unreeling wire, rod and the like which is strong and rugged in its construction and, consequently, one that is easy and inexpensive to maintain.

Various other objects and advantages of this invention will be more apparent in the course of the following specification and will be particularly pointed out in the appended claims.

In the accompanying drawings there is shown, for the purpose of illustration, one embodiment which my invention may assume in practice.

Figure 1:
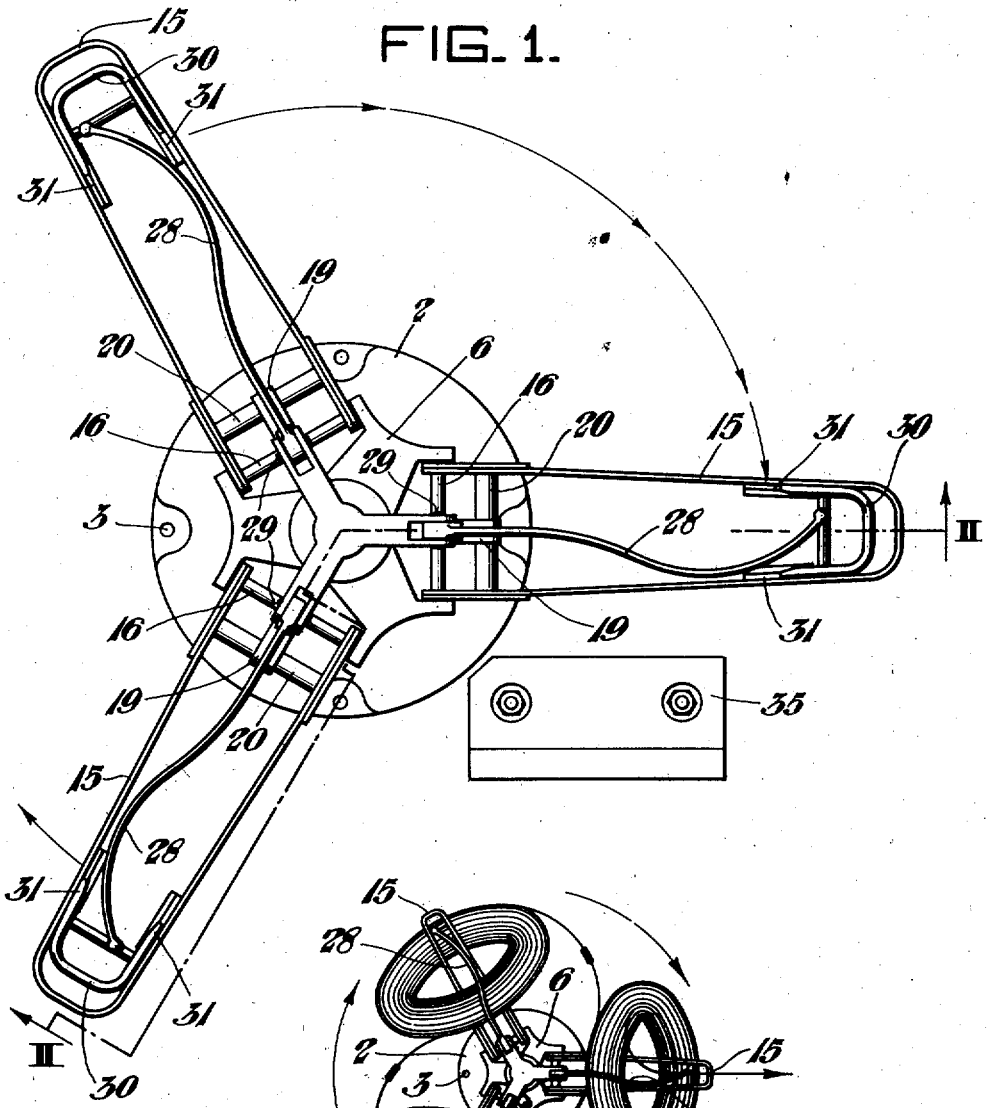
Figure 1 is a plan of the improved unreeling apparatus of my invention.

Referring more particularly to the drawings, the improved apparatus or device for unreeling bundles of coiled wire, rod and the like, comprises a base or pedestal 2 which is adapted to be placed on or secured to the floor opposite the wire-drawing or other wire-working machine with which it is to be used, preferably by means of lag screws 3 or any other suitable means. There is mounted in a cylindrical opening 4 arranged in the base or pedestal 2, a vertically disposed shaft 5 having its lower end securely retained therein, preferably by means of a set screw carried thereby. There is rotatably mounted on the upper portion of the shaft 5 preferably a cast iron frame or body member 6 having roller bearings 7 and 8 associated therewith for loosely and rotatably supporting the body member 6 on the upper portion of the shaft 5. There is also arranged in a cylindrical opening 9 arranged in the base or pedestal 2 to one side of the shaft 5, a plunger pin 10, the upper end of which is adapted to cooperate with spaced apart lugs 12 arranged annularly around the shaft on the bottom surface of the body member 6. The pin 10 is movably mounted in the opening 9 and held therein preferably by means of a pin 13 and there is positioned below the pin a coil spring 14 which is adapted to normally force the pin upwardly to position the top end thereof in contact with the bottom surface of the body member 6.

There is arranged on the body member 6 three pairs of outwardly radially extending arms, each of which is adapted to hold a bundle of coiled wire or rod. It will be seen that only three pairs of arms are shown, but it will be understood that any number of pairs of arms as desired may be provided. Each pair of these arms consists of an upper U-shaped arm 15 having its inner end pivotally attached to the upper portion of the body member 6 by means of a pin 16 and a correspondingly-shaped lower arm 17 spaced therebelow being pivotally attached to the lower portion of the body member 6 by means of a pin 18. The upper arm 15 and the lower arm 17 of each of the pairs are interconnected by means of a link member 19 with the upper end of the link being pivotally connected to the upper arm 15 forwardly of the pin 16 by means of a pin 20 and the lower end of the link being pivotally connected to the arm 17 rearwardly of the pin 18 by means of a pin 21.

There is arranged preferably between the arms 15 and 17 of each of the pairs, a pin 22 pivotally arranged on the side of the body member 6. There is securely attached to the pin 22 at one end thereof a lever 23 having a counterweight 24 arranged on the outer end thereof and an angular actuating portion 25 disposed on the inner end thereof which is adapted to extend to the side of the body member 6 between the pairs of arms. There is also securely attached to the pin 22 intermediate the link thereof a dog member or pawl 26 which is adapted to cooperate with a notch 27 arranged on the interconnecting link member 19, the purpose of which is to be described hereinafter.

There is associated with each of the pairs of arms above the upper arm 15 thereof, an arcuate-shaped coil retaining or flipper member 28 having its inner end loosely pivoted to the upper portion of the body member 6 at 29 with the outer free end thereof adapted to rest on the outer free end of the upper arm 15. Each of the arms 15 preferably has arranged thereon, adjacent the outer end thereof and securely attached thereto as at 31, an upwardly angularly extending U-shaped guard member 30 which is positioned adjacent the free end of the flipper member 28 and adapted to hold the coils of wire thereon. Each of the lower arms 17 of each of the pairs has arranged therewith and securely attached thereto, as at 32, adjacent the outer end thereof, a similar U-shaped guard member 33 which extends downwardly and outwardly from the arm 17 with the bottom free end thereof adapted to rest on preferably a steel or other suitable annular plate member 34 arranged on the floor around the bottom of the base 2 which is adapted to support the outer free end of each of the lower arms 15 and also to prevent movement of the coils over the free ends of the arms. There is also positioned on the floor and suitably attached thereto within the annular steel plate member 34 and opposite the position that the coils of wire assume on the pairs of arms, a bumper member 35 of any suitable shape and which is adapted for a purpose to be described hereinafter. The U-shaped guard members 30 and 33 are preferably formed from a rubber sheathed mining machine cable.

Figure 5:
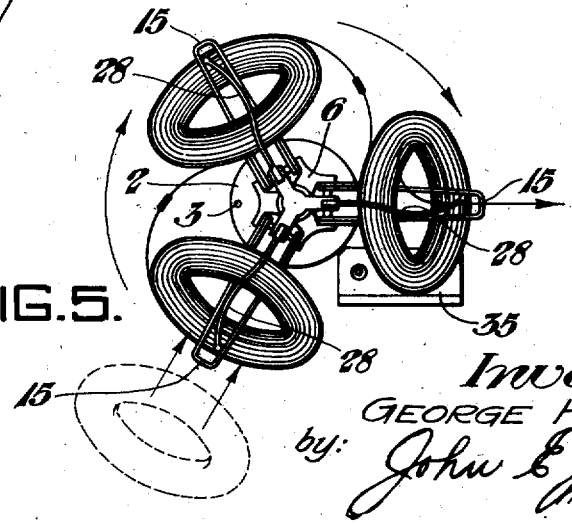
Figure 5 is a smaller plan similar to Figure 1 showing the bundles of coiled wire in position thereon.
Figures 2, 4:
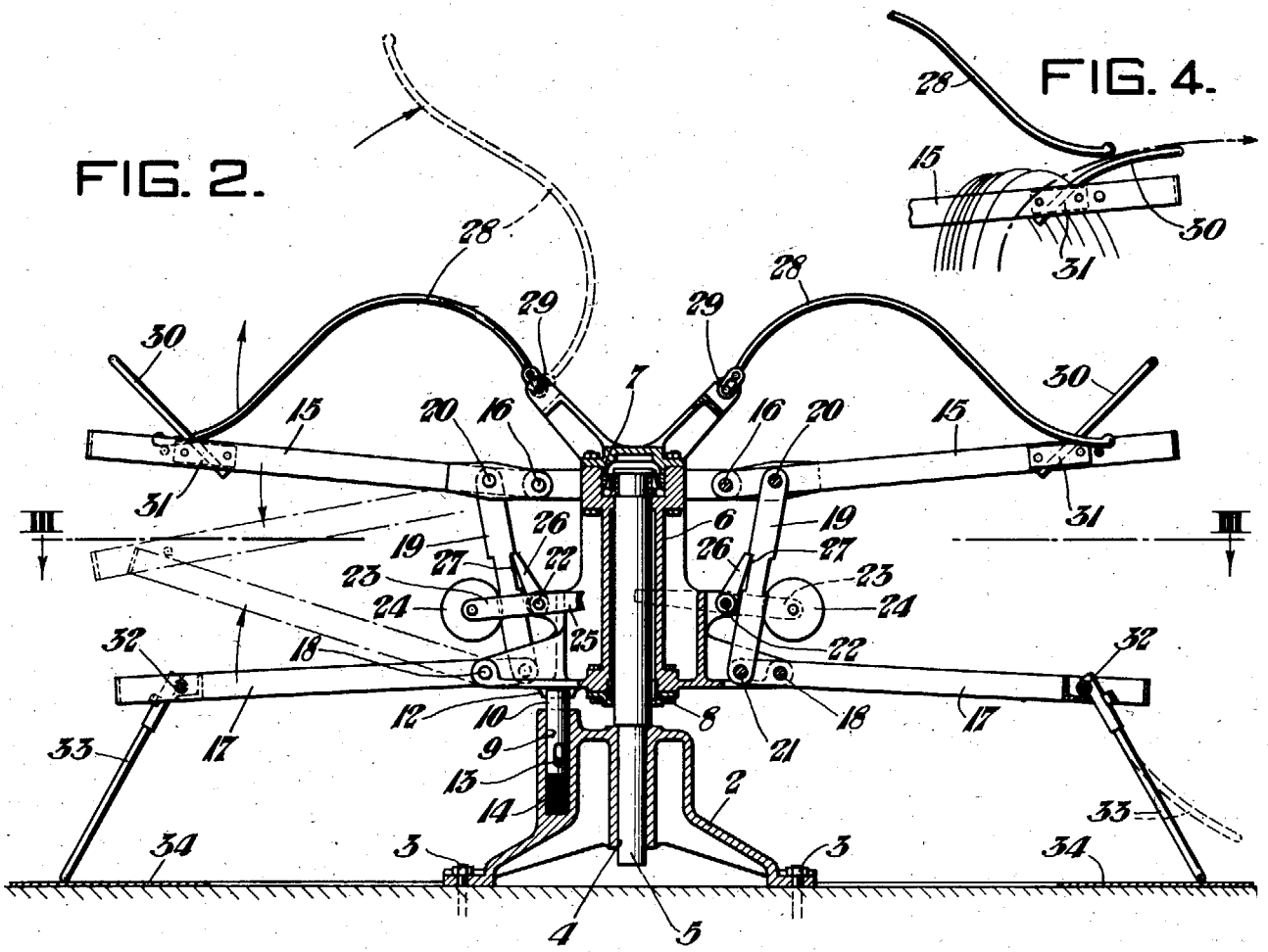
Figure 2 is a section taken from line II—II of Figure 1.
Figure 4 is an elevation of the outer end of one of the upper arms and the parts associated therewith.
Figure 3:
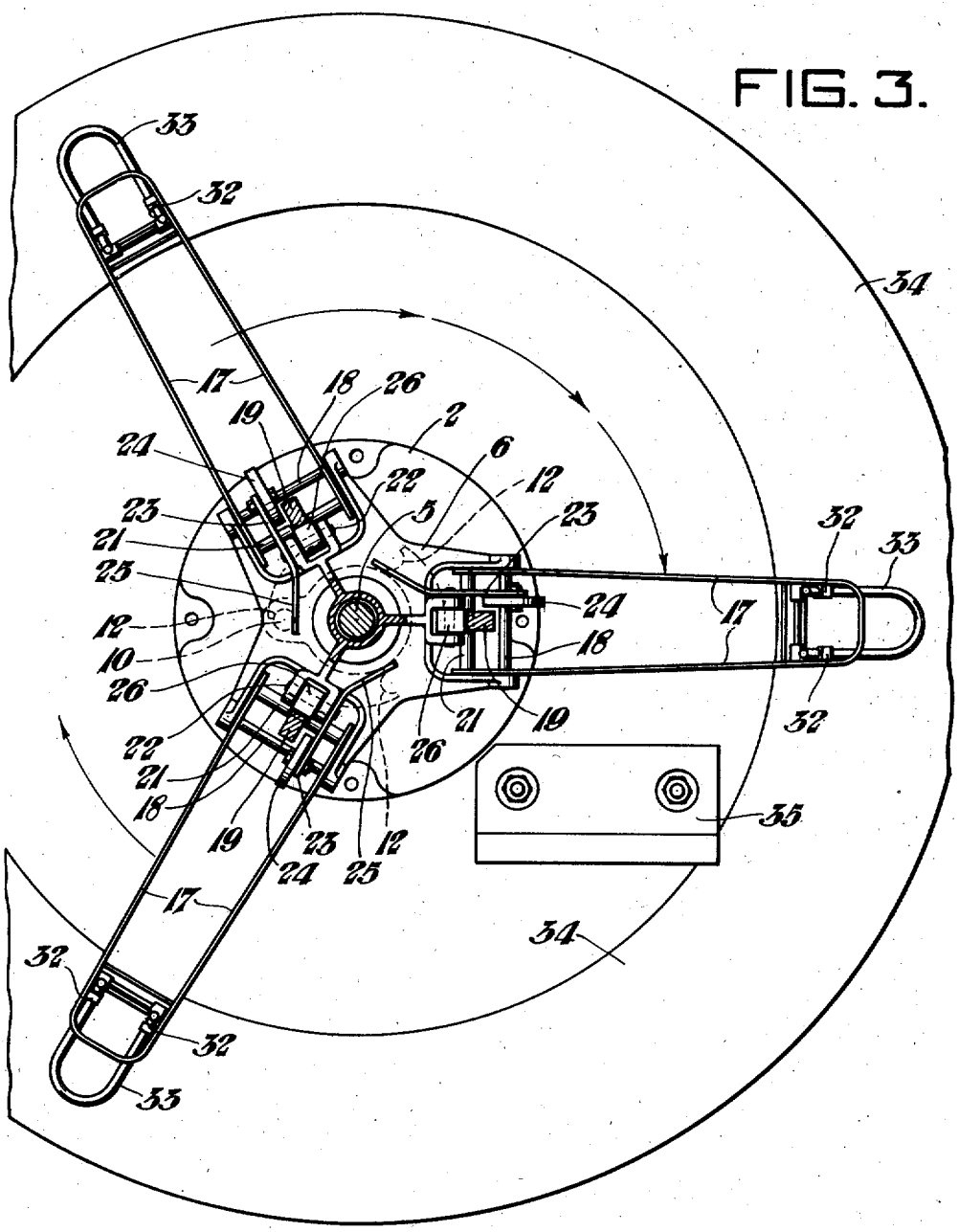
Figure 3 is a section taken from line III—III of Figure 2.

The apparatus or device as above described operates as follows:

A bundle of coiled wire or rod is first placed on each of the pairs of arms as shown in Figure 5. To place the coils on each of the pairs of arms, the flipper member 28 is first moved upwardly away from the upper arm 15 and out of contact therewith as shown in the broken lines of Figure 2, and the respective lever 23 is then actuated by manually forcing the angular portion 25 thereof extending between the pairs of arms downwardly, thereby disengaging the dog or pawl 26 from engagement with the notch 27 of the respective link 19, thereby permitting the outer free ends of the arms 15 and 17 to move toward each other, as also shown in the broken lines of Figure 2. While the arms 15 and 17 are together, the coil of wire is placed thereon and the upper arm is then moved manually upwardly until the dog or pawl 26 engages the notch 27 in the link 19 due to the action of the counterweight 24 and the arms are securely held in their spaced apart position thereby. The flipper member 28 is then moved downwardly so as to be positioned over the coil and with the outer free end thereof resting on the outer end of the arm 15. One of the arms with the bundles thereon is then aligned with the machine to which the wire is adapted to pass and the front end of the wire is threaded into the machine so as to pass therethrough. The end of the wire at the rear of this coil is then welded to the end of the wire at the front of the coil on the next succeeding pair of arms and the end of the wire at the rear of the coil is welded to the end of the wire at the front of the coil on the next succeeding pair of arms. The device is now ready for operation and the wire is drawn off the pair of arms opposite the machine and, when the coil of wire thereon is depleted, the device is rotated by the pull of the wire on the next pair of arms by the wire-working machine so as to position the coil on this pair of arms opposite the machine and the feeding of the wire is transferred to the coil thereon. As the device rotates, it will be seen that the bottom of the coil of wire on that pair of arms adapted to be positioned in alignment with the wire-working machine strikes the bumper member 35 mounted on the floor, thereby preventing the further rotation of the device but permitting the pair of arms to pass thereover after the coil thereon is depleted so as to permit the next coil to be properly positioned opposite the machine. The bundles of coiled wire are then successively placed, as described, on the pair of arms on which the coil previously thereon has been depleted and the end of the wire at the front thereof is welded to the end of the wire at the rear of the preceding bundle of coiled wire that preceded before on the next succeeding pair of arms. Thus, it will be seen that, with such an arrangement, the wire or rod is fed continuously to the wire-working machine. It will be understood that the flipper member 28 and the rubber sheathed guard 30 on the end of the upper arm 15 and the rubber sheathed guard 33 on the end of the lower arm 17 act to retain the convolutions of the coiled wire on the arms, thereby permitting but one coil or convolution at a time to pass therefrom when tension is applied to the end of the wire or rod by the wire-working machine as shown in Figure 4 of the drawings.

It will be seen that the pin 10 cooperates with the lugs 12 on the bottom of the rotatable body member 6 to prevent the same from rebounding upon rotation after the bundle to be positioned strikes the bumper member 35 thereby securely locking the body member 6 in position after the movement thereof so as to maintain the particular pair of arms from which the wire is being drawn by the machine in alignment therewith until the bundle of wire thereon has been depleted therefrom.

As a result of my invention, it will be seen that after one bundle of coiled wire has been depleted, another coil of wire is automatically positioned in alignment with the machine and an uninterrupted supply of wire is delivered thereto.

While I have shown and described one embodiment of my invention, it will be understood that this embodiment is merely for the purpose of illustration and description and that various other forms may be devised within the scope of my invention, as defined in the appended claims.

I claim:

1. A device of the class described comprising a vertically disposed member rotatably mounted, at least three pairs of arms carried by said member extending outwardly therefrom with each of said arms having their inner ends pivotally attached to said member, the arms of each pair being spaced apart and arranged one above the other, disengageable means for holding said arms against pivotal movement on said member, and means interconnecting the inner ends of each pair of said arms which is adapted to move the outer free ends thereof toward each other when the holding means is disengaged so as to facilitate the placing of the coils of wire thereon.

2. A device of the class described as defined in claim 1 including means arranged on the outer end of the lower arm of each of said pairs and extending downwardly therefrom which is adapted to cooperate with means positioned therebelow to support the outer free end of said arms.

3. A device of the class described as defined in claim 1 including means arranged above the upper arms of each of said pairs which is adapted to cooperate therewith to hold the coils of wire thereon and permit the convolution of the coils to pass therefrom one at at time.

4. A device of the class described including, in combination, a rigidly supported base, a vertically disposed member rotatably mounted on said base, a plurality of pairs of arms carried by said member extending outwardly radially therefrom with each of the arms having their inner ends pivotally attached to said member, the arms of each pair being spaced apart and arranged one above the other, a link member interconnecting the inner ends of the arms of each pair, disengageable means cooperating with said link to retain said arms against pivotal movement and hold them in a fixed position, each of said links being so constructed and arranged relative to the arms which they interconnect as to move the outer free ends of the arms of each pair toward each other when the retaining means is disengaged from said link so as to facilitate the placing of the coils of wire thereon.

5. A device of the class described including, in combination, a rigidly supported base, a vertically disposed shaft having its lower end securely mounted in said base, a member rotatably mounted on the upper portion of said shaft, a plurality of pairs of arms carried by said member extending outwardly radially therefrom with each of the arms having their inner end pivotally attached to said member, the arms of each pair being spaced apart and arranged one above the other, a link member interconnecting the inner ends of the arms of each pair, a pawl arranged on said rotatable member adjacent each pair of arms which is adapted to cooperate with each of the respective links to retain said arms against pivotal movement and hold them in a fixed position, and means for disengaging said pawl from said link so that the outer free ends of the arms of each pair will move toward each other so as to facilitate the placing of the coils of wire thereon.

6. A device of the class described comprising a vertically disposed member rotatably mounted and a plurality of pairs of spaced apart radially extending arms carried by said rotatable member with each of said pairs of arms adapted to hold a coil of material in substantially a vertical plane which is connected to the coil arranged on the next succeeding pair of arms, both arms of each of said pairs having their inner ends pivotally attached to said rotatable member with the outer ends thereof being free, means for holding said arms in spaced relation and against pivotal movement on said rotatable member, and means for moving the arms about their respective pivotal connections whereby the outer free ends of the arms of the respective pairs are moved toward each other so as to permit the placing of a coil of material thereon.

7. A device of the class described comprising a vertically disposed member rotatably mounted, at least three pairs of spaced apart radially extending arms carried by said rotatable member with each of said pairs of arms adapted to hold a coil of material in substantially a vertical plane which is connected to the coil arranged on the next succeeding pair of arms, means carried by each pair of said arms for preventing movement of the coils over the free ends of the arms, at least one of the arms of each of said pairs having its inner end pivotally attached to said rotatable member with the outer ends of both of the arms being free, and means for holding the pivoted arm of each pair in spaced relation relative to the opposed arm thereof and against pivotal movement on said rotatable member, said pivoted arm of each pair adapted to be moved about its respective pivotal connection whereby the outer free end of the pivoted arm of each is adapted to be moved toward the other arm so as to permit the placing of a coil of material over and around the pair of arms.

GEORGE H. ROSE.